United States Patent [19]
Knudsen et al.

[11] Patent Number: 5,545,600
[45] Date of Patent: Aug. 13, 1996

[54] PROCESS FOR THE PREPARATION OF DIALKYLTIN DIALKOXIDE

[76] Inventors: George A. Knudsen, 1932 Mary Ellen La., Scotch Plains, N.J. 07076; Elena N. Suciu, 417 Prospect, Ridgewood, N.J. 07450; Robert C. Michaelson, One Glendale Terr., Kinnelon, N.J. 07405

[21] Appl. No.: 361,269

[22] Filed: Dec. 21, 1994

[51] Int. Cl.$^6$ ............................................. B01J 31/22
[52] U.S. Cl. ................... 502/152; 502/20; 502/22; 502/161; 502/170; 502/171; 556/88; 556/89
[58] Field of Search ................. 502/20, 22, 152, 502/161, 170, 171; 556/88, 89

[56] References Cited

U.S. PATENT DOCUMENTS

| | | | |
|---|---|---|---|
| 2,583,084 | 1/1952 | Burt | 260/429 |
| 2,700,675 | 1/1955 | Mack et al. | 260/429 |
| 2,727,917 | 12/1955 | Mack et al. | 260/429 |
| 3,492,327 | 1/1970 | Davies | 260/429.7 |
| 5,034,551 | 7/1991 | Vernon et al. | 556/89 |
| 5,374,754 | 12/1994 | Hoenel et al. | 556/89 |

FOREIGN PATENT DOCUMENTS

| | | | |
|---|---|---|---|
| 0569845 | 5/1993 | European Pat. Off. | C07F 7/22 |
| 664133 | 1/1952 | United Kingdom | |

OTHER PUBLICATIONS

Davies et al., "Organotin Chemistry. Part XI. The Preparation of Organotin Alkoxides", *Journal of Chemical Society*, 1971, pp. 3972–3976. (month unknown).

M. G. Voronkov and Yu. P. Romadan, New Method for the Synthesis of Dialkoxydialkyltins, *Zhurnal Obshchei Khimii*, vol. 39, No. 12, pp. 2785–2786, Dec. 1969.

*Primary Examiner*—Michael Lusignan
*Assistant Examiner*—Timothy H. Meeks
*Attorney, Agent, or Firm*—John J. Mahon; John F. Hunt; Richard D. Jordan

[57] ABSTRACT

A process for making a catalyst product which comprises reacting dialkyltin oxide with an alcohol and the corresponding dialkyl carbonate at a temperature in the range between about 50° to 200° C. and at a pressure in the range between about 75 to 600 psi (0.52 to 4.14 MPa), wherein the catalyst product comprises dialkyltin dialkoxide in the range between about 90 to 100 mole % based on the tin species of the catalyst product. This process also forms effective catalyst product when the methanol is replaced with either a primary or secondary alcohol.

27 Claims, 3 Drawing Sheets

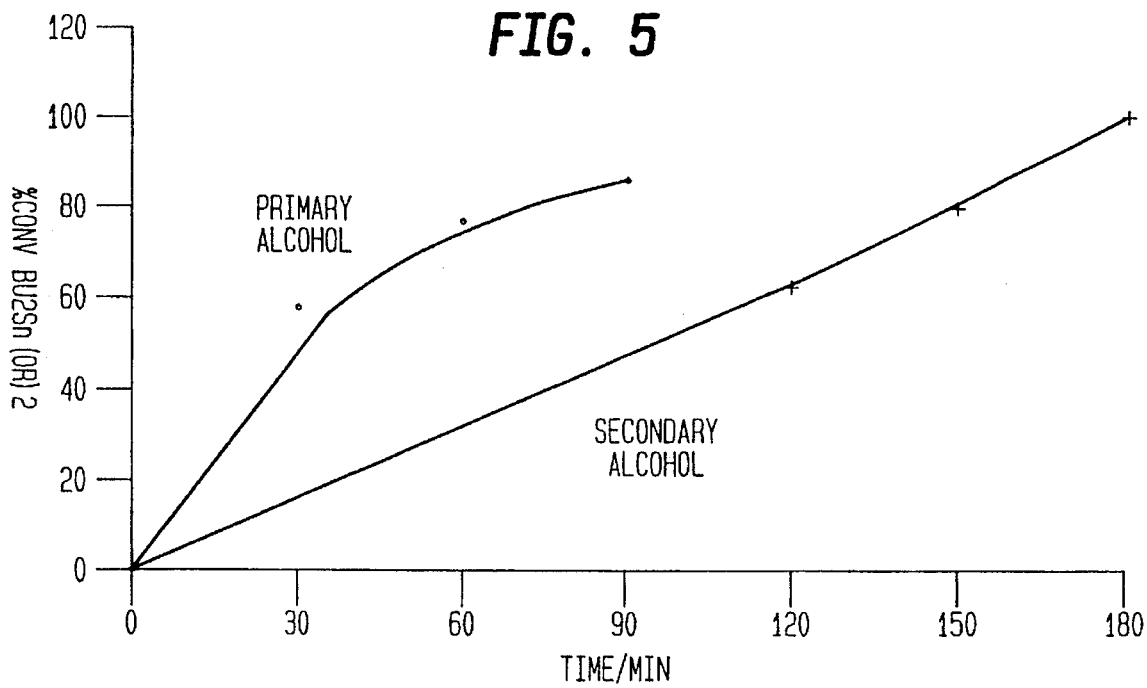

PROCESS FOR THE PREPARATION OF DIALKYLTIN DIALKOXIDE

The present invention relates generally to the synthesis of dialkyltin dialkoxide (e.g., dibutyltin dimethoxide) from dialkyltin oxide. The dialkyltin oxide is treated with an alcohol and the corresponding carbonate at elevated temperature and pressure to produce dialkyltin dialkoxide in quantitative yields.

BACKGROUND OF THE INVENTION

One method for the preparation of dibutyltin dimethoxide involves the reaction of dibutyltin dichloride with sodium methoxide (Equation 1). This method of synthesis is described in U.S. Pat. No. 2,700,675 (Mack et al.) and is shown below:

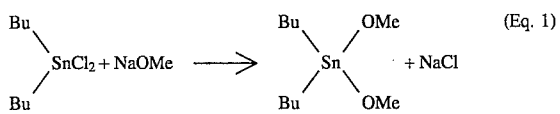

(Eq. 1)

The crude dibutyltin dimethoxide is then purified by vacuum distillation. The relatively high cost of dibutyltin dimethoxide using the above process has prompted an investigation of alternative synthetic routes using relatively inexpensive starting materials.

Dibutyltin dialkoxides of higher alcohols have been synthesized by transesterification of dibutyltin dimethoxide with alcohols such as 1-dodecanol. This process is described in U.S. Pat. No. 2,727,917 (Mack et al.) and is shown below in Equation 2:

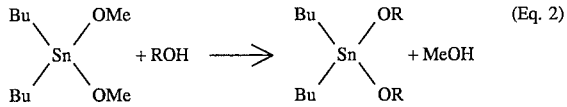

(Eq. 2)

Also, dialkoxides of primary, alcohols have been synthesized via a two step reaction. The first step involves condensation of dibutyltin oxide with a primary alcohol in refluxing benzene or toluene at 80°–110° C., to produce 1,3-bis(alkoxy)tetrabutyl distannoxane. Water which is formed as a product in the condensation reaction is removed by azeotropic distillation. In the second step the distannoxane undergoes disproportionation at 180°–220° C. under reduced pressure to produce dibutyltin oxide and dibutyltin dialkoxide as shown below in Equation 3:

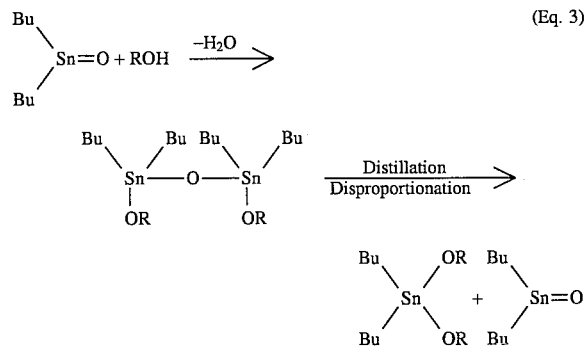

(Eq. 3)

It should be noted, however, that secondary alcohols do not react with dibutyltin oxide in this way.

The method illustrated by the reactions shown in Equation 3 does not work for methanol which does not form an azeotrope with water. Treatment of dibutyltin oxide with methanol and toluene at temperatures ranging from 115°–180° C. and pressures varying from ambient to 400 psi (2.756 MPa) results in the formation of 1,3 bis(methoxy)tetrabutyl distannoxane, but does not produce the desired dibutyltin dimethoxide in any significant yield.

An alternative route involving the reaction of dibutyltin oxide with dimethyl carbonate (in the presence of traces of methanol) to produce 1,3 bis(methoxy)tetrabutyl distannoxane exclusively is described in an article by Davies et al., entitled "Organic Chemistry, Pan XI—The Preparation of Organotin Alkoxides", *Journal of Chemical Society*, (C) (1971), pp. 3972–6. The reaction according to the Davies article is conducted in the presence of toluene at 80°–110° C. and 1 atmosphere pressure.

The present inventors have discovered that the highly desirable dibutyltin dimethoxide can be synthesized by reacting the 1,3 bis(methoxy)tetrabutyl distannoxane formed according to the Davies et al. article with methanol and dimethyl carbonate at elevated temperatures and pressures. Surprisingly, the present inventors also discovered that the addition of dimethyl carbonate as a reactant to a mixture of dibutyltin oxide and methanol, at elevated temperatures and pressures results in quantitative yields of dibutyltin dimethoxide along with the evolution of a quantitative amount of carbon dioxide.

Hence, the present inventors have discovered a unique low cost synthetic route to dibutyltin dimethoxide. Dibutyltin dimethoxide is a highly effective catalyst in numerous applications such as transesterification, esterification, ester interchange, transamination, and the synthesis of organic carbonates by the reaction of alcohols with alkyl carbamates and/or urea. The catalyst prepared by this technique may be used without purification thereby achieving an additional cost savings. This compound, as mentioned previously, is a starting material for the synthesis of dibutyltin alkoxides based on higher molecular weight alcohols as shown in Equation 2 above.

The present invention can also be used as a means of recycling and reactivating partially spent tin catalysts from the aforementioned applications by reconverting the inactive tin compounds to the dialkyltin dialkoxide by treatment with water followed by treatment with alcohol and dialkyl carbonate as described herein.

The present invention also provides many additional advantages which shall become apparent as described below.

SUMMARY OF THE INVENTION

A process for making a catalyst product which comprises reacting dialkyltin oxide with an alcohol (e.g., methanol) and dialkyl carbonate at a temperature in the range between about 50° to 200° C. and at a pressure in the range between about 75 to 600 psi (0.52 to 4.14 MPa), wherein the catalyst product comprises dialkyltin dialkoxide in the range between about 90 to 100 mole % (based on tin species within the catalyst product), more preferably about 95 to 100 mole %. Preferably the dialkyltin oxide is dibutyltin oxide and the dialkyl carbonate is dimethyl carbonate, thereby producing dibutyltin dimethoxide. The reaction time required for quantitative conversion to dimethoxide is typically between about 3 to 4 hours.

The present invention also includes a process for making a catalyst product by reacting dialkyltin oxide with any primary or secondary alcohol and dialkyl carbonate at a temperature in the range between about 130° to 190° C. and at a pressure in the range between about 0.17 to 1.38 MPa, wherein the catalyst product comprises dialkyltin dialkoxide in the range between about 40 to 75 mole % (based on tin species of the catalyst product), more preferably 50 to 75 mole %. This reaction occurs for a period of between about 3 to 4 hours.

The primary alcohol is selected from the group consisting of $C_2$ to $C_{10}$ primary alcohols. The secondary alcohol is selected from the group consisting of $C_2$ to $C_{10}$ secondary alcohols. The catalyst product according to this embodiment also includes 1,3 bis(alkoxy)tetraalkyl distannoxane in the range between about 25 to 75 mole % (based on tin species of the catalyst product), more preferably 25 to 50 mole %.

The present invention also encompasses a process for recycling or reactivating partially spent tin catalysts (e.g., dialkyltin dicarboxylate catalysts or dialkyltin dialkoxide catalysts) generated from applications such as transesterification, esterification, ester interchange, transamination, and the synthesis of organic carbonates by reconverting the inactive or spent tin compounds to the dialkyltin dialkoxide by treatment with water, followed by treatment with alcohol and dialkyl carbonate as described herein. For example, a dialkyl carbonate reaction product synthesized from organic carbonates typically comprises alkyl carbamate, alkylated by-products, dialkyl carbonate, dialkyltin dialkoxide catalyst and carbonate-forming alcohol. The tin catalyst used during the synthesis of organic carbonates is reactivated or regenerated by the following steps: separating the dialkyltin dialkoxide catalyst from the dialkyl carbonate reaction product thereby forming a dialkyltin dialkoxide catalyst-enriched stream and a dialkyltin dialkoxide catalyst-poor stream; reacting the dialkyltin dialkoxide catalyst-enriched stream with water to form a dialkyltin oxide stream; drying the dialkyltin oxide stream reacting the dialkyltin oxide stream with a reactivation alcohol and dialkyl carbonate thereby forming a reactivated dialkyltin dialkoxide catalyst stream; and recycling the reactivated dialkyltin dialkoxide catalyst stream to the reaction vessel.

Other and further objects, advantages and features of the present invention will be understood by reference to the following specification in conjunction with the annexed drawings.

BRIEF DESCRIPTION OF THE DRAWINGS

FIG. 5 is a graph plotting the conversion of dibutyltin oxide to dibutyltin dialkoxide in the presence of carbonate and either primary alcohols or secondary alcohols against time.

DESCRIPTION OF THE PREFERRED EMBODIMENTS

Figure 1:
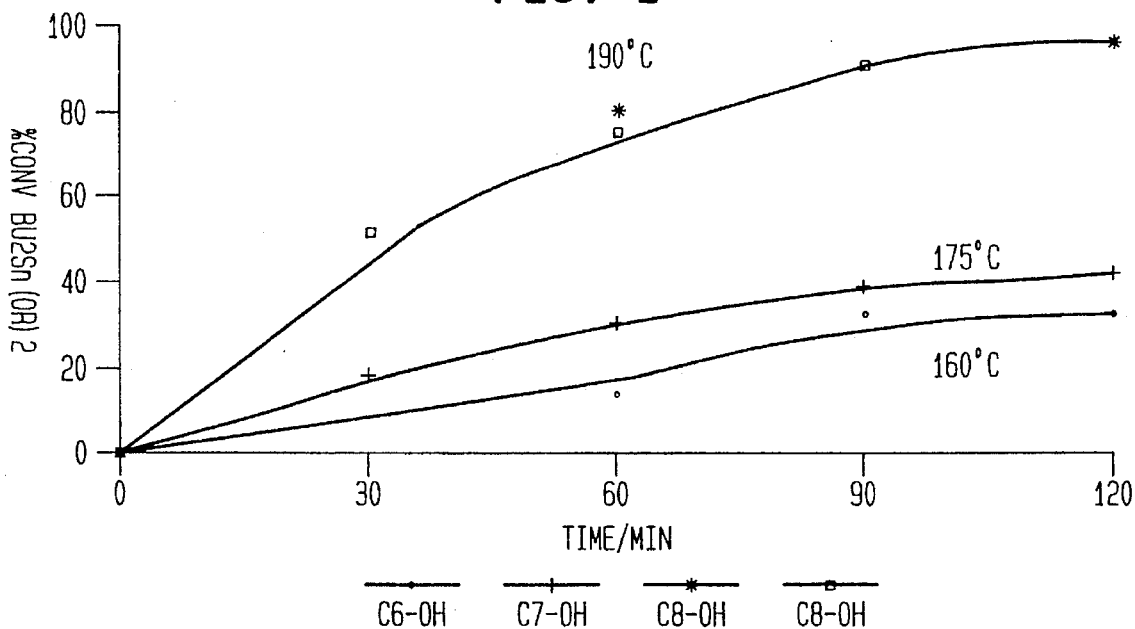
FIG. 1 is a graph plotting the conversion of dibutyltin oxide to dibutyltin dialkoxide in the presence of ROH, wherein R is any $C_6$ to $C_8$ alkyl group, as a function of reaction time.

Dibutyltin oxide is reacted with methanol and dimethyl carbonate, at a temperature in the range between about 50° to 200° C. and at a pressure in the range between about 75 to 600 psi (0.52 to 4.14 MPa) resulting in a quantitative formation of dibutyltin dimethoxide (i.e., dibutyltin dimethoxide is present in the final product in an amount between about 90 to 100 mole % (based on tin species in the catalyst product), more preferably about 95 to 100 mole %) and carbon dioxide as shown in Equation 4 below:

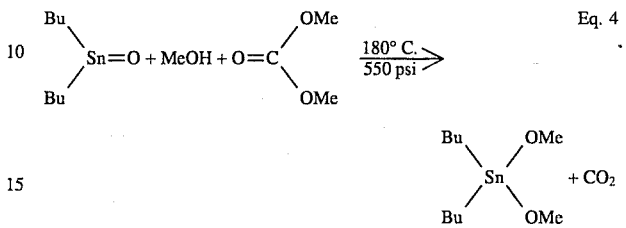

Eq. 4

Operating with sufficient pressure is important so far as it enables one to attain high enough temperatures for the reaction to proceed. As such, temperature is a critical variable, while pressure is only helpful in reaching the desired temperatures.

A mixture of dibutyltin dialkoxides and 1,3 bis(alkoxy) tetrabutyl distannoxane can be synthesized by reacting dibutyltin oxide, dimethyl carbonate and higher primary alcohols (e.g., $C_2$ to $C_{10}$ alcohols, more preferably $C_6$ to $C_9$ alcohols) at temperatures in the range of between about 130°–190° C. at atmospheric pressure as shown in Equation 5 below:

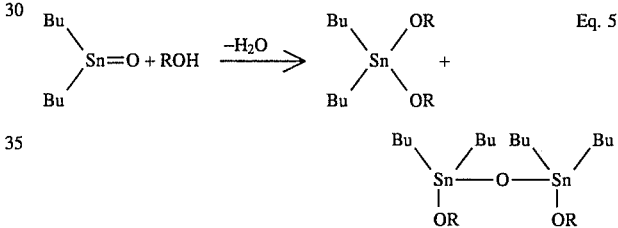

Eq. 5

Dibutyltin dialkoxides were obtained in high yields versus other tin species at high reaction temperatures. The reaction rate is increased by addition of an azeotropic solvent. Quantitative yields of dibutyltin dialkoxides were obtained in short reaction time at lower temperatures by the use of an organic carbonate (e.g., dimethyl carbonate). It was also discovered that carbonates derived from secondary alcohols react with dibutyltin oxide to give the corresponding dibutyltin dialkoxides in quantitative yield (i.e., dibutyltin dialkoxide were present in an amount between about 40 to 75 mole % based on tin species, more preferably 50 to 75 mole % based on tin species.

The catalyst according to the present invention can be used to synthesize dimethyl carbonate (DMC) which is an important industrial chemical. Dimethyl carbonate is preferably prepared via a two step process. The first step involves the synthesis of alkyl carbamate from urea or the like and an alcohol, i.e., ROH, wherein R is any aliphatic, cycloaliphatic, arylaliphatic, arylcycloaliphatic, heterocyclic aliphatic, or non-aromatic heterocyclic monohydric group comprising from 1 to about 16 carbon atoms. This step involves the reaction of urea or the like with an alcohol (e.g., methanol) at temperatures and pressures such that the alcohol which contains the $NH_3$ (a reaction product) is allowed to flash off from the reactor and which is replaced with fresh alcohol to maintain a constant level in the reactor. Urea can also be added to the reactor for a continuous operation. In this case alkyl carbamate and alcohol/NH3 are continuously flashed off from the reactor and replaced with urea and fresh alcohol.

In the second step the alkyl carbamate synthesized in the first step or obtained elsewhere is reacted with an alcohol (i.e., the alcohol may be either the same or different from the alcohol used in the carbamate synthesis step or a mixture of various alcohols) in the presence of the dialkyltin dialkoxide catalyst of the present invention to form dialkyl carbonate and $NH_3$. The alcohol and the formed dialkyl carbonate are distilled from the reactor and the alkyl carbamate/alcohol solution is fed to replace that which is removed by distillation. Under these conditions, virtually no by-products (i.e., alkylation products of the starting material) are formed and alkyl carbamate is quantitatively converted to dialkyl carbonate.

To avoid the formation of N-alkyl by-products during the carbonate synthesis process the following critical operating parameters must be adhered to: (1) addition of catalyst in an amount in the range between about 5 to about 50 weight % based on the entire reaction solution (more preferably between about 10–25 weight %), (2) maintaining very low free alcohol concentration in the reaction solution of about 10 to about 30 weight % based on total carbamate and alcohol content of the reactor solution, (3) maintaining a carbamate concentration in the range between about 70–90 weight % based on total carbamate and alcohol content of the reactor solution, and (4) distilling off dialkyl carbonate product such that it has a concentration of between about 1 to about 3 weight % based on total carbamate and alcohol content of the reactor solution. The alkyl carbamate to alcohol molar ratio is preferably in the range between about 2:1 to about 10:1, more preferably between about 3:1 to about 5:1.

It is also desirable to maintain the temperature of the carbonate reactor in the range between about 140° C. to about 220°. The pressure of the reactor is autogeneous, i.e., the sum of the vapor pressure of the alcohol, ammonia and alkyl carbamate at the reaction temperature.

The reaction is preferably run as a continuous process wherein dialkyl carbonate is continuously distilled from the reactor together with excess alcohol thereby preventing the formation of N-alkyl by-products and thus allowing extremely high selectivity and conversion of carbamate to carbonate.

In order to further avoid the formation of N-alkyl alkyl carbamate and N-alkyl urea by-products, the synthesis process of the present invention can be modified by treating a slip stream of the main reactor (which contains N-alkyl alkyl carbamate and N-alkyl urea together with the dialkyltin dialkoxide catalyst, dialkyl carbonate, alkyl carbamate and alcohol) with excess alcohol in a secondary reaction vessel under suitable temperatures and pressures. Since the catalyst is present in the secondary reaction vessel it will convert the N-alkyl carbamate and urea by-products to dialkyl carbonate and alkyl amine.

It is also likely that any part of the catalyst which became inactive with time on stream may be restored to its original active state. The methyl amine generated is purged and scrubbed or incinerated and the ammonia is recovered and sent back to the urea plant. The balance of the stream, which contains the dimethyl carbonate, methanol and catalyst, is recycled back to the reactor. At the end of the reaction, the catalyst (e.g., dibutyltin dimethoxide) can alternatively be converted by treatment with water to dibutyltin oxide ($Bu_2Sn=O$), which can be recycled as a catalyst precursor. The dibutyltin oxide catalyst precursor, after drying, can be reconverted to the dibutyltin dimethoxide by treatment with methanol or dimethyl carbonate.

The reactivation or regeneration of spent tin catalyst by treatment thereof with water, followed by alcohol and alkyl carbonate is also suitable for various other applications such as transesterification, esterification, ester interchange and transamination.

EXAMPLE 1

1,3 bis(methoxy)tetrabutyltin distannoxane (36.2 grams, 66.5 mmol), methanol (101.9 grams, 3184 mmol), and dimethyl carbonate (42.0 grams, 466 mmol) were charged into a 300 ml Hastelloy C™ autoclave and sparged with nitrogen. The reactor was heated to 179° C. at a pressure of 556 psi (3.83 1 MPa) for four hours while sparging with nitrogen at a flow rate of 50 ml/min. The reactor was cooled and depressurized. 170 grams of product were collected under nitrogen as a clear colorless solution. The product was then stripped of excess methanol and dimethyl carbonate. Analysis of the residue by 119Sn and 13C NMR confirmed the quantitative conversion to dibutyltin dimethoxide. The NMR data is set forth below in Table 1.

TABLE 1

| | | (119Sn NMR Data) | | |
|---|---|---|---|---|
| Example # | R | $Bu_2Sn(OR)_2$ δ ppm | $Bu_2Sn(OR)OSn(OR)Bu_2$ δ ppm | Solvent |
| 1–2 | $C_1$ | −160.0 | no data | Neat |
| | $C_1$ | no data | −169.6: −176.0 | CDCl3 |
| | $C_1$ | no data | −171: −183.40 | toluene |
| 3 | $C_1$ | no data | −177.0; −183.0 | Reaction Product Neat |
| 4 | $C_6$ | −130.0 br | −177.7; −186.8 | " |
| 5 | $C_7$ | −183.0 br | −177.9; −187.3 | " |
| 6 | $C_8$* | −84.4 br | −172.5; −184.2 | " |
| 7 | | (Repeat of Example 6) | | |
| 8–13 | $C_9$ | −157.0 −158.4 br | −178.2; −188.6 | " |
| 14 | sec-$C_4$ | −21.5 br | −175.6; −190.7 | " |

*denotes 2-ethyl-1-hexyl.
br denotes broad.

EXAMPLE 2

Dibutyltin oxide (50.5 grams, 203 mmol), methanol (100.1 grams, 3130 mmol) and dimethyl carbonate (39.4 grams, 438 mmol) were charged into a 300 ml Hastelloy C™ autoclave and sparged with nitrogen. The reactor pressure was set at 500 psi (3.445 MPa) by means of a back pressure regulator. The nitrogen which exited the reactor was passed through a trap containing Drierite™ and then through a trap containing a weighted amount of Ascarite™ (both sold by Aldrich Chemical Co.). The gas exiting the Ascarite™ trap was sent to a bubbler containing oil in order to obtain visual evidence of the flow of gas through the system. The reactor was heated at 177° C. After approximately two hours the vessel containing Ascarite™ became hot to the touch which During this time dibutyltin oxide dissolved. The reaction was refluxed for two hours with periodic collection of samples which were analyzed by 119Sn NMR for the molar ratio dibutyltin dialkoxide versus 1,3 bis(alkoxy) tetrabutyl distannoxane. The relevant data is presented in Table 2 and FIG. 1, i.e., the rate of conversion of dibutyltin oxide into stannoxane and distannoxane in the absence of dialkyl carbonate. The NMR data is presented above in Table 1 above.

TABLE 2

| Ex. | R | Bu2SnO (mmol) | ROH (mmol) | Temp. (°C.) | Time (min.) | Product Yields (mole %) | |
|---|---|---|---|---|---|---|---|
| | | | | | | $Bu_2Sn(OR)_2$ | $Bu_2Sn(OR)OSn(OR)Bu_2$ |
| 4 | $C_6$ | 80.3 | 320.0 | 160 | 30 | 0 | 100 |
| | | | | | 60 | 13 | 87 |
| | | | | | 60 | 32 | 68 |
| | | | | | 120 | 32 | 68 |
| 5 | $C_7$ | 80.3 | 320.0 | 176 | 30 | 18 | 82 |
| | | | | | 60 | 30 | 70 |
| | | | | | 90 | 39 | 61 |
| | | | | | 120 | 42 | 58 |
| 6 | $C_8$ | 80.3 | 320.0 | 190 | 0 | 0 | 100 |
| | | | | | 60 | 80 | 20 |
| | | | | | 120 | 96 | 4 |
| 6 | $C_8$ | 80.3 | 320.0 | 190 | 30 | 51 | 49 |
| | | | | | 60 | 75 | 25 |
| | | | | | 90 | 90 | 10 |
| 8* | $C_9$ | 80.3 | 320.0 | 176 | 30 | 23 | 77 |
| | | | | | 60 | 41 | 59 |
| | | | | | 90 | 48 | 52 |
| | | | | | 120 | 57 | 43 |

*denotes 73 grams of decane used as a solvent in this example.

indicated that carbon dioxide was being formed as reaction byproduct and was reacting with the Ascarite™. After one hour the Ascarite™ trap began to cool. The reactor was maintained at 177° C. for an additional 1.5 hours and then cooled and depressurized. A sample of the reactor content was analyzed by 119Sn NMR which showed that dibutyltin dimethoxide was the major compound in the reaction. (See Table 1 above). The Ascarite™ trap re-weight showed a gain of 8.87 grams (200 mmol $CO_2$).

EXAMPLE 3

1,3 bis(methoxy)tetrabutyl distannoxane (20.1 grams, 37 mmol), methanol (69.1 grams, 2030 mmol) and trimethyl orthoformate (10.1 grams, 95 mmol) were charged into a 300 ml Hastelloy C™ autoclave and sparged with nitrogen. The reactor pressure was set at 540 psi (3.721 MPa) with a back regulator and the reactor was heated to 179° C. for a period of five hours. The reactor was then cooled and depressurized and the reaction product was discharged into a nitrogen sparged bottle. The resulting product had a milky appearance. Analysis by 119Sn and 13C NMR indicated the presence of unreacted starting material.

EXAMPLE 4

A reaction mixture containing dibutyltin oxide (20 grams, 80.3 mmol) suspended in 1-hexanol (60 grams, 587 mmol) in a 250 ml flask provided with magnetic stirrer, temperature control, heating mantle, Dean Stark apparatus, and condenser, was refluxed by keeping the system under a nitrogen blanket. At 160° C. (time=0), the azeotrope water-hexanol (approximately 28 grams) was collected in the Dean Stark apparatus over a period of approximately ten minutes.

EXAMPLE 5

Same as Example 4 above except the mixture was heated at 176° C. The data is presented in Table 2 above and FIG. 1.

EXAMPLE 6

Same as Example 4 above, except the mixture was heated at 176° C. and wherein 2-ethyl-1-hexanol (68 grams, 525 mmol) was used in place of 1-heptanol. The data is presented in Table 2 above and FIG. 1.

EXAMPLE 7

Same as Example 6 above. The data is presented in Table 2 above and FIG. 1.

EXAMPLE 8

Figure 2:
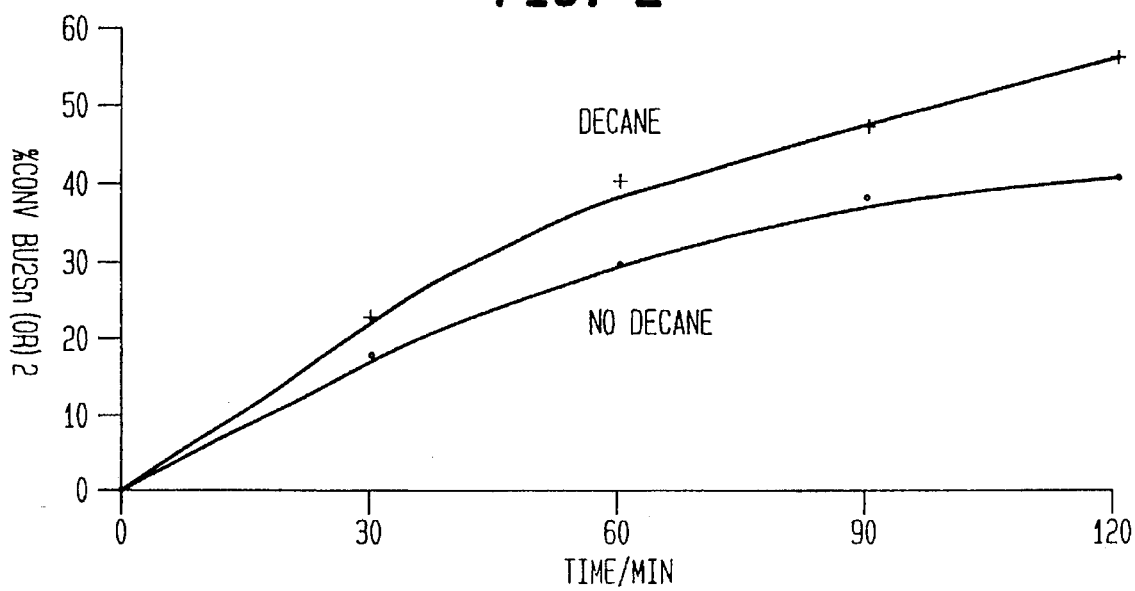
FIG. 2 is a graph plotting the conversion of dibutyltin oxide to dibutyltin dialkoxide in the presence of $C_9OH$ against time with and without decane.

Same as Example 5 above, except the mixture of 1-nonanol (46 grams, 320 mmol) and decane (73 grams) is used in place of 1-heptanol. The data is presented in Table 2 above. The results obtained with addition of decane are compared to those obtained in the absence of decane in FIG. 2.

EXAMPLE 9

Figure 3:
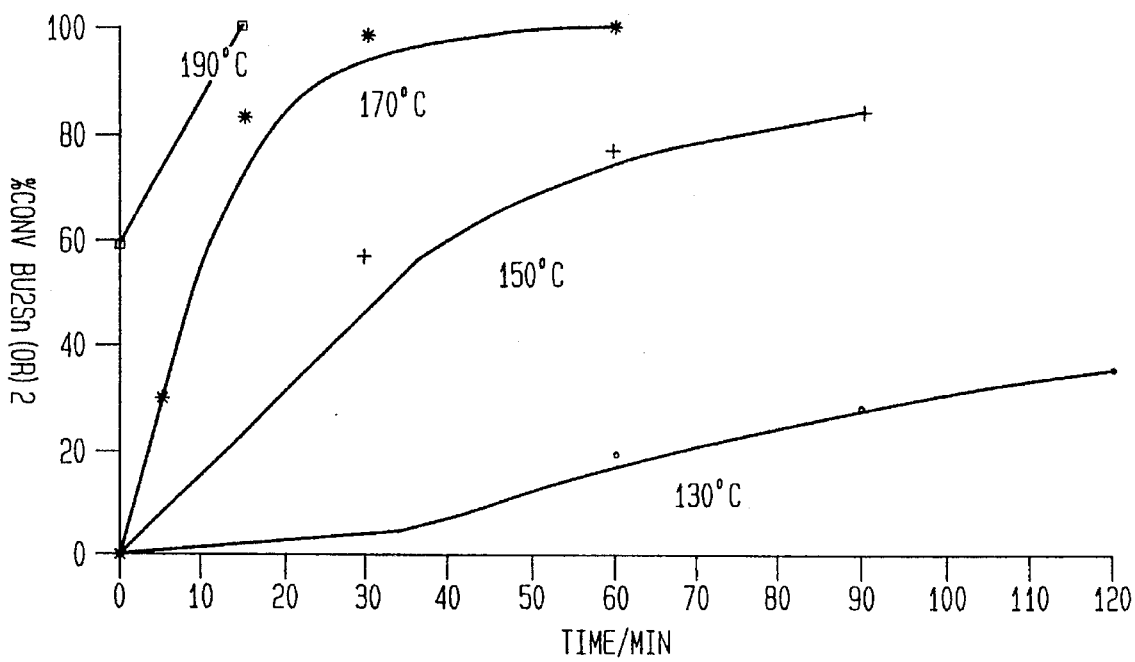
FIG. 3 is a graph plotting the conversion of dibutyltin oxide to dibutyltin dialkoxide in the presence of carbonate $C_9OH$ against time for various temperatures.

A reaction mixture containing dibutyltin oxide (20 grams, 80.30 mmol), 1-nonanol (1.15 grams, 8.00 mmol) and dinonyl carbonate (35 grams, 110 mmol) were heated in a flask as described in Example 4 above without using the Dean Stark apparatus. The temperature was maintained at 130° C. The data for this example is presented in Table 3 below and FIG. 3, e.g., the rate of conversion of dibutyltin oxide into stannoxanes and distannoxanes in the presence of dialkyl carbonates. The advantage of using carbonates appears when FIG. 3 is compared against FIG. 1.

Example 9 above. The data is presented in Table 3 above. The data obtained with the carbonate of a secondary alcohol (i.e., Example 14) are compared to data obtained with a carbonate of a primary alcohol (i.e., Example 10) in FIG. 5.

TABLE 3

| Ex.# | R | Bu2SnO mmol | ROH mmol | OC(OR)2 mmol | Temp. °C. | Time min | Product Yields (mole %) | |
|------|---|---|---|---|---|---|---|---|
|      |   |   |   |   |   |   | Bu2Sn(OR)$_2$ | Bu$_2$Sn(OR)OSn(OR)Bu$_2$ |
| 9 | C$_9$ | 80.3 | 8.0 | 110$^a$ | 130 | 0 | 0 | 100 |
|   |   |   |   |   |   | 60 | 19 | 81 |
|   |   |   |   |   |   | 90 | 28 | 72 |
|   |   |   |   |   |   | 120 | 35 | 65 |
| 10 | C$_9$ | 80.3 | 8.0 | 110$^a$ | 150 | 30 | 57 | 43 |
|   |   |   |   |   |   | 60 | 77 | 23 |
|   |   |   |   |   |   | 90 | 84 | 16 |
| 11 | C$_9$ | 80.3 | 8.0 | 110$^a$ | 170 | 5 | 30 | 70 |
|   |   |   |   |   |   | 15 | 83 | 17 |
|   |   |   |   |   |   | 30 | 98 | 2 |
|   |   |   |   |   |   | 60 | 100 | 0 |
| 12 | C$_9$ | 80.3 | 8.0 | 110$^a$ | 190 | 0 | 59 | 41 |
|   |   |   |   |   |   | 15 | 100 | 0 |
| 13* | C$_9$ | 80.3 | 8.0 | 110$^a$ | 150 | 30 | 21 | 79 |
|   |   |   |   |   |   | 60 | 49 | 51 |
|   |   |   |   |   |   | 90 | 69 | 31 |
|   |   |   |   |   |   | 120 | 80 | 20 |
| 14 | C$_6$ | 80.3 | 9.8 | 236$^b$ | 150 | 0 | 0 | — |
|   |   |   |   |   |   | 120 | 62 | 38 |
|   |   |   |   |   |   | 150 | 80 | 20 |
|   |   |   |   |   |   | 180 | 100 | 0 |
| 15 | C$_9$ | 80.3 | 320 | 96$^c$ | 135 | 120 | No Reaction | — |

*30 grams of the 80 gram xylene initially charged was distilled in the Dean Stark apparatus.
$^a$dinonylcarbonate
$^b$di-sec-butylcarbonate used instead of dihexylcarbonate.
$^c$ortho n-butyric acid trimethyl ester used instead of dinonylcarbonate.

EXAMPLE 10

Same as Example 9, except it was heated at 150° C. The data for this example is set forth in Table 3 above and in FIG. 3.

EXAMPLE 11

Same as Example 9, except it was heated at 170° C. The data for this example is set forth in Table 3 above and in FIG. 3.

EXAMPLE 12

Same as Example 9, except it was heated at 190° C. The data for this example is set forth in Table 3 above and in FIG. 3.

EXAMPLE 13

Figure 4:
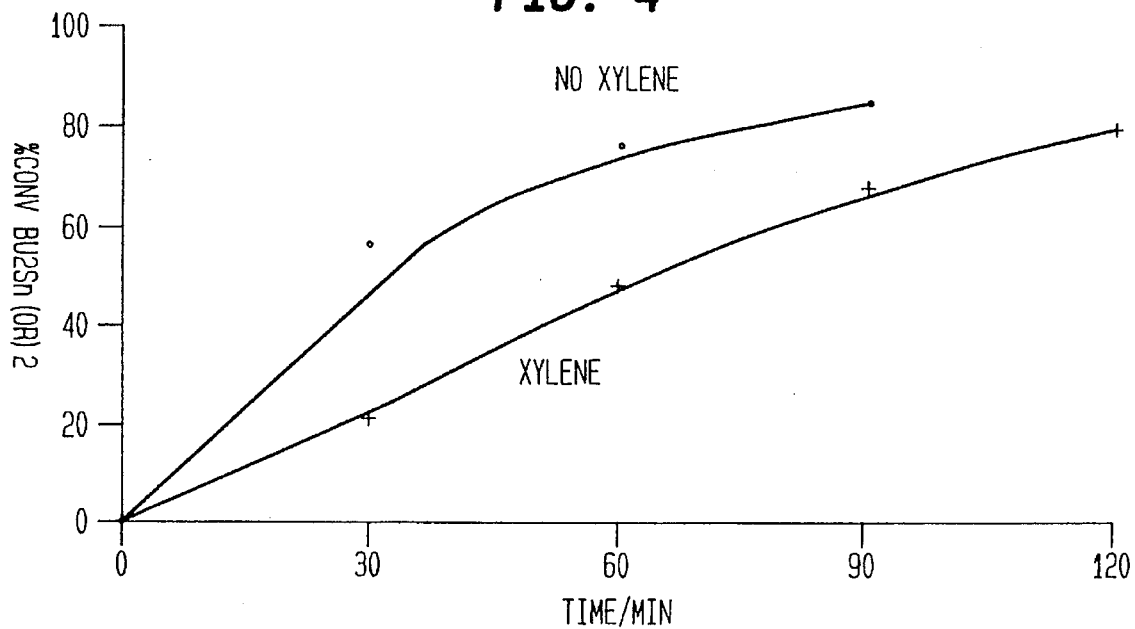
FIG. 4 is a graph plotting the conversion of dibutyltin oxide to dibutyltin dialkoxide in the presence of $C_9OH$ and carbonate against time with and without xylene.

Same as Example 9, except it was reacted in the presence of xylene (80 grams) and using the Dean Stark apparatus at 150° C. The data for this example is set forth in Table 3 above. The results obtained in the presence of xylene in this example were compared to those in the absence of xylene (i.e., Example 10) in FIG. 4.

EXAMPLE 14

A reaction mixture of dibutyltin oxide (20 grams, 80.3 mmol) suspended in 1-hexanol (1 gram, 9.8 mmol) and di-sec-butyl carbonate (41 grams, 236 mmol) was heated at 150° C. for two hours in a flask equipped as described in Example 9 above. The data is presented in Table 3 above.

EXAMPLE 15

A reaction mixture of dibutyltin oxide (20 grams, 80.3 mmol), suspended in 1-nonanol (46 grams, 320 mmol) and ortho n-butyric acid trimethyl ester (14 grams, 96 mmol) was heated at 135° C. for two hours in a flask equipped as described in Example 9. No reaction was observed.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A process for making a catalyst product containing tin species which comprises reacting dialkyltin oxide with monohydric alcohol and a dialkyl carbonate having the same alkyl group as said dialkoxide at a temperature in the range between about 50° to 200° C. and at a pressure in the range between about 0.52 to 4.14 MPa, wherein said catalyst product comprises dialkyltin dialkoxide in the range between about 90 to 100 mole % based on the tin species of said catalyst product.

2. The process according to claim 1 wherein said dialkyltin oxide is dibutyltin oxide.

3. The process according to claim 1 wherein said dialkyl carbonate is dimethyl carbonate.

4. The process according to claim 1 wherein said alcohol is methanol.

5. The process according to claim 1 wherein said reaction occurs for a period of between about 3 to 4 hours.

6. The process according to claim 1 wherein said catalyst product also comprises carbon dioxide.

7. The process according to claim 1 wherein said dialkyltin dialkoxide is dibutyltin dimethoxide.

8. The process according to claim 1 wherein said catalyst product comprises dialkyltin dialkoxide in the range between about 95 to 100 mole % based on the tin species of said catalyst product.

9. A process for making a catalyst product containing tin species which comprises reacting dialkyltin oxide with any primary or secondary monohydric alcohol and dialkyl carbonate at a temperature in the range between about 130° to 190° C. and at a pressure in the range between about 0.17 to 1.3 8 MPa, wherein said catalyst product comprises dialkyltin dialkoxide in the range between about 40 to 75 mole % based on the tin species of said catalyst product.

10. The process according to claim 9 wherein said dialkyltin oxide is dibutyltin oxide.

11. The process according to claim 9 wherein said dialkyl carbonate is dimethyl carbonate.

12. The process according to claim 9 wherein said reaction occurs for a period of between about 3 to 4 hours.

13. The process according to claim 9 wherein said primary monohydric alcohol is selected from the group consisting of: $C_2$ to $C_{10}$ primary alcohols.

14. The process according to claim 9 wherein said secondary monohydric alcohol is selected from the group consisting of: $C_2$ to $C_{10}$ secondary alcohols.

15. The process according to claim 9 wherein said catalyst product also comprises 1,3 bis(alkoxy)tetraalkyl distannoxane in the range between about 25 to 60 mole % based on the tin species of said catalyst product.

16. The process according to claim 9 wherein said dialkyltin dialkoxide is dibutyltin dimethoxide.

17. The process according to claim 9 wherein said catalyst product comprises dialkyltin dialkoxide in the range between about 50 to 75 mole % based on the tin species of said catalyst product.

18. The process according to claim 17 wherein said catalyst product comprises 1,3 bis(alkoxy)tetraalkyl distannoxane in the range between about 25 to 50 mole % based on the tin species of said catalyst product.

19. A process for reactivating partially spent tin catalyst comprising the following steps:

separating said spent tin catalyst from a reaction product which comprises said spent tin catalyst and other organics thereby forming a catalyst-enriched stream and a catalyst-poor stream;

reacting said catalyst-enriched stream with water to form a dialkyltin oxide stream; and reacting said dialkyltin oxide stream with a monohydric and dialkyl carbonate thereby forming a reactivated dialkyltin dialkoxide catalyst stream.

20. The process according to claim 19 further comprising the step of recycling said reactivated dialkyltin dialkoxide catalyst stream to a reaction vessel.

21. The process according to claim 19 wherein said spent tin catalyst is contained within a reaction product from at least one of the following reactions: esterification, ester interchange, transamination, transesterification and synthesis of organic carbonates.

22. The process according to claim 19 wherein said spent tin catalyst is a dialkyltin dicarboxylate catalyst.

23. The process according to claim 19 wherein said spent tin catalyst is a dialkyltin dialkoxide catalyst.

24. A process for reactivating partially spent dialkyltin dialkoxide catalyst used for making a dialkyl carbonate reaction product in a reaction vessel, said dialkyl carbonate reaction product comprises alkyl carbamate, alkylated by-products, dialkyl carbonate, dialkyltin dialkoxide catalyst and a first alcohol, said process comprising the following steps:

separating said dialkyltin dialkoxide catalyst from said dialkyl carbonate reaction product thereby forming a dialkyltin dialkoxide catalyst-enriched stream and a dialkyltin dialkoxide catalyst-poor stream;

reacting said dialkyltin dialkoxide catalyst-enriched stream with water to form a dialkyltin oxide stream;

reacting said dialkyltin oxide stream with a first monohydric alcohol and dialkyl carbonate thereby forming a reactivated dialkyltin dialkoxide catalyst stream; and recycling said reactivated dialkyltin dialkoxide catalyst stream to said reaction vessel.

25. The process according to claim 24 wherein said dialkyl carbonate reaction product is formed by:

reacting urea with a second alcohol in a carbamate reactor at a temperature and pressure sufficient to convert said urea to an alkyl carbamate; and reacting said alkyl carbamate with said first alcohol in the presence of a dialkyltin dimethoxide catalyst in a carbonate reactor at a temperature and pressure sufficient to convert said alkyl carbamate to a dialkyl carbonate reaction product, wherein said first alcohol is at least one alcohol that is either the same as or different from said second alcohol.

26. The process according to claim 24 wherein said dialkyltin dialkoxide catalyst is formed by a process for making a catalyst product containing tin species reacting dialkyltin oxide with a fourth monohydric alcohol and a dialkyl carbonate having the same alkyl group as said dialkoxide at a temperature in the range between about 50° to 200° C. and at a pressure in the range between about 0.52 to 4.14 MPa, wherein said catalyst product comprises dialkyltin dialkoxide in the range between about 90 to 100 mole % based on the tin species of said catalyst product.

27. The process according to claim 26 wherein said second monohydric alcohol is either the same as or different from said first alcohol and/or said first monohydric alcohol.

* * * * *